Patented Dec. 18, 1923.

1,478,027

UNITED STATES PATENT OFFICE.

LLOYD C. DANIELS AND WINTHROP S. LAWRENCE, OF BUFFALO, NEW YORK, ASSIGNORS TO NATIONAL ANILINE & CHEMICAL COMPANY, INC., OF NEW YORK, N. Y., A CORPORATION OF NEW YORK.

PRODUCTION OF VAT DYESTUFFS.

No Drawing.    Application filed July 20, 1921.    Serial No. 486,195.

*To all whom it may concern:*

Be it known that we, LLOYD C. DANIELS and WINTHROP S. LAWRENCE, citizens of the United States, residing at Buffalo, in the county of Erie, State of New York, have invented certain new and useful Improvements in the Production of Vat Dyestuffs; and we do hereby declare the following to be a full, clear, and exact description of the invention, such as will enable others skilled in the art to which it appertains to make and use the same.

This invention relates to improvements in the production of vat dyestuffs and more particularly to the production, purification and isolation of dyestuffs such as are produced by the fusion of benzanthrone with caustic alkali.

When benzanthrone is fused with caustic alkali, for the production of the dyestuff known as dibenzanthrone, we have found that the product produced by the fusion is a composite product which is made up in part of a vatable dye, and in part of a non-vatable by-product, the latter being insoluble or difficultly soluble in alkaline hydrosulphite solution. We have further found that the removal of the non-vatable by-product greatly increases the strength of the dye, that its shade is considerably brightened, and that it is much improved for use as an intermediate for the preparation of nitro-dibenzanthrone (viridanthrene). The non-vatable by-product, while it colors cotton but slightly, nevertheless probably goes on to the fiber from colloidal suspension, when it is present with the dye, since the increase in strength of the dye does not appear proportionate to the amount of purified dye recovered.

We have further found that when benzanthrone is fused with caustic alkali and an organic reducing agent such as dextrine, the dye is produced in a reduced form which is soluble in a solution of caustic alkalies. The product of such a fusion, therefore, need be only diluted to a proper concentration with water, which contains sufficient caustic soda to get a caustic concentration corresponding to a 2 to 5% sodium hydroxide solution and sufficient sodium hydrosulfite to offset any oxygen dissolved in the water, in order to get a solution of the dye from which the non-vatable impurity can be removed by a simple filtration. The purified dye may then be recovered by aerating or otherwise suitably oxidizing the filtrate, when the dye is precipitated, and may be filtered off, washed free of caustic and dried, or, instead of being dried, it may be made up to any desired concentration of paste.

Accordingly, in the practice of the invention we subject benzanthrone to fusion with caustic alkali and an organic reducing agent, and we subject the resulting product of the fusion to extraction with an alkali solution containing sufficient hydrosulfite to prevent oxidation of the dye and thereby bring about a separation of the vatable dye from the non-vatable by-product, thus obtaining the vat dye in a completely soluble form with greatly increased strength. Insofar as we are aware, the products thus obtained are new, and we accordingly claim them as a part of our invention.

The invention will be further illustrated by the following specific example, the parts being by weight.

A mixture of 100 parts of caustic potash and 420 parts of mineral oil having a boiling point of about 230° C. and obtained from steam distilled kerosene, is heated to 215°–230° C., and to this heated mixture is gradually added with agitation an intimate mixture of 24 parts of dextrin and 100 parts of sublimed benzanthrone, and the resulting mass is maintained at this temperature until the reaction is completed.

Upon completion of the reaction, the reaction mixture is treated to remove the mineral oil therefrom and to separate the vatable dye from the non-vatable by-product. This may advantageously be effected by blowing the fusion product from the fusion kettle directly into an iron tank containing 12000 to 16000 parts of 2% caustic soda solution containing about 2 gms. of hydrosulphite per liter. The kerosene will separate as a protecting layer, while the dilute alkali solution will serve to dissolve the vatable constituent of the composite product and the hydrosulfite used will protect it from oxidation by oxygen dissolved in the water. The solution can then be heated to 66°–70°, filtered from the undissolved by-product, and the filtered cake washed with a further amount of dilute alkaline hydrosulphite solution heated to about 60°–70° C. The dye is then precipitated from the solution by boiling and by aeration, that is, by blowing air through the solution until all of the dye is precipitated. The dye is then filtered off and washed free from alkali and can then be made into a paste, or it may be dried at 100 to 125° C. for use as a powder.

The vatable dye thus obtained has a greatly increased strength as compared with the dye produced by the caustic fusion of benzanthrone, without the isolation and purification above described. This vatable dye can be still further purified if desired by subjecting it to extraction with dichlorbenzol (known commercially as "solvent 74"), or other organic solvents, which extracts a certain amount of non-dye impurities, thereby further increasing the dye purity and strength. This further purification, however, is not necessary as the dye strength, even without such purification, is far in excess of the strength required for the commercial dye.

The non-vatable by-product, which is practically insoluble in dilute alkaline hydrosulphite solution, we also regard as a new product. This by-product itself, being relatively insoluble in dilute alkaline hydrosulphite solution, is of relatively less value for direct use as a dye, although it is of value, for example, for shading purposes, or for use in the form of a colloidal suspension, as well as for the production of other dyestuffs therefrom.

While the crude product resulting from the fusion is a dull violet black when dry and a dull violet when moist, the purified vatable dye has a violet color when moist and a brownish violet color with a coppery reflex when dry; and the non-vatable by-product has a dull violet black color when dry and a dull reddish violet color when moist. When subjected to the action of concentrated sulphuric acid, the impure product forms a turbid violet solution, the non-vatable by-product a greenish black solution and the vatable dye a clear violet solution. One of the important differences between the different products is in their behavior with nitric acid. The vatable dye (separated from non-vatable impurities) upon nitration gives a nitrated dye of superior strength over that obtained by the nitration of the impure product, while the non-vatable by-product, on the other hand, upon nitration gives a product which imparts a dull, weak greenish gray color to vegetable fibers when it is used as a vat dye.

In the following claims it is understood that the expression "benzanthrone compounds" is used as a generic term to include benzanthrone, or a derivative, homologue, or analogue thereof.

We claim:

1. The improvement in the production of vat dyes, which comprises subjecting benzanthrone compounds, to fusion with caustic alkali, and treating the resulting product with a dilute alkaline hydrosulfite, and filtering the solution to separate the vatable dye from the insoluble by-product.

2. The method of treating products resulting from the fusion of benzanthrone with caustic alkali, which comprises subjecting such products to treatment with a dilute alkaline hydrosulfite liquor, and filtering, thereby separating a vatable dye from an insoluble by-product.

3. The method of treating products resulting from the fusion of benzanthrone with caustic alkali and an organic reducing agent, which comprises diluting such a fusion mixture with water containing no dissolved oxygen or containing sufficient sodium hydrosulfite to neutralize the effect of any dissolved oxygen, and filtering, thereby separating the vatable dye from an insoluble by-product.

4. The method of treating products resulting from the fusion of benzanthrone with caustic alkali, which comprises subjecting such products to treatment with a dilute alkaline hydrosulfite liquor, and filtering thereby separating a vatable dye from the insoluble by-product, and recovering the vatable dye from the resulting solution by heating and aeration.

5. The method of purifying crude dibenzanthrone obtainable by the fusion of benzanthrone with caustic potash, which comprises subjecting crude dibenzanthrone to treatment with dilute alkaline hydrosulfite liquor and separating by filtration the solution of vatable dye from undissolved impurities.

6. Method of purifying crude dibenzanthrone compounds which comprises subjecting said products to treatment with a dilute alkaline hydrosulfite liquor, filtering and thereby separating the solution of vatable dye from the insoluble by-products.

7. As a new product, a non-vatable product resulting from the fusion of benzanthrone with caustic alkali, said product being insoluble in dilute alkaline hydrosulfite.

8. As a new product, a non-vatable product resulting from the fusion of a benzanthrone compound with caustic alkali, said product being insoluble in dilute alkaline hydrosulfite.

9. The method of treating products resulting from the fusion of benzanthrone compounds with caustic alkali and an organic reducing agent, which comprises diluting such a fusion mixture with water containing no dissolved oxygen or containing sufficient sodium hydrosulfite to neutralize the effect of any dissolved oxygen, and filtering, thereby separating the vatable dye from undissolved impurities.

10. The method of treating products resulting from the fusion of benzanthrone compounds with caustic alkali and dextrine, which comprises diluting such a fusion mixture with water containing no dissolved oxygen or containing sufficient sodium hydrosulfite to neutralize the effect of any dissolved oxygen, and filtering, thereby separating the vatable dye from undissolved impurities.

11. The method of treating products resulting from the fusion of benzanthrone with caustic alkali and dextrine, which comprises diluting such a fusion mixture with water containing no dissolved oxygen or containing sufficient sodium hydrosulfite to neutralize the effect of any dissolved oxygen, and filtering, thereby separating the vatable dye from undissolved impurities.

12. The method of treating the products resulting from the fusion of benzanthrone compounds with caustic alkali, which comprises subjecting the fusion mass to treatment with alkaline hydrosulfite liquor, removing the solution of dissolved products from undissolved products, aerating the solution with air and collecting by filtration the precipitate thereby produced.

13. The method of treating the products resulting from the fusion of benzanthrone with caustic potash and dextrine, which comprises subjecting the fusion mass to treatment with dilute hydrosulfite liquor, removing the solution of dissolved products from undissolved impurities, aerating the solution with air and collecting by filtration the precipitate of purified dibenzanthrone thereby produced.

14. The method of purifying crude dibenzanthrone, which comprises subjecting crude dibenzanthrone to treatment with alkaline hydrosulfite liquor, removing the solution of vatable dye from undissolved impurities, aerating the solution with air and collecting by filtration the precipitate of purified dibenzanthrone thus produced.

In testimony whereof we affix our signatures.

LLOYD C. DANIELS.
WINTHROP S. LAWRENCE.